UNITED STATES PATENT OFFICE.

BERNARD LANDE, OF NEW YORK, N. Y., ASSIGNOR OF ONE-HALF TO SAMUEL B. WELLINGTON, OF SAME PLACE.

MANUFACTURE OF ARTIFICIAL STONE.

SPECIFICATION forming part of Letters Patent No. 299,810, dated June 3, 1884.

Application filed May 3, 1884. (No specimens.)

*To all whom it may concern:*

Be it known that I, BERNARD LANDE, a citizen of the United States, residing at New York, in the county of New York and State of New York, have invented certain new and useful Improvements in the Manufacture of Artificial Stone, of which the following is a specification.

My invention relates to the manufacture of artificial stone; and it consists in certain elements united in certain proportions, as will be hereinafter more specifically described.

It has been found that cement and iron slag, pulverized and mixed in certain proportions, form an artificial stone that is hard, durable, and will not easily chip or wear. Iron slag contains iron, carbonaceous and silicious matter, and other elements in greater or less proportion, which, when mixed with certain proportions of Portland, Akron, or other suitable cement, form a stone which is not disintegrated by frost and will stand a tensile and breaking strain greater than natural stone. I take the slag and pulverize it or grind it to a suitable degree of fineness and mix it with cement in about the proportion of two to six parts of ground slag to one of cement. If the slag be deficient in silicious matter, I add a portion of sand requisite to give body to the stone. For certain qualities of stone I will use but one part of slag to one of cement. For fine stone I may use one part cement, one of slag, and three of sand.

It is obvious that the proportions of the several elements may be varied without departing from the spirit of my invention.

As a new article of commerce, the pulverized and dry materials are mixed in proper proportions, packed in barrels or casks, ready for shipment. As before intimated, the proportions of iron slag and cement may be varied to suit the requirements of the case.

The packages containing the mixture are marked No. 1, 2, 3, &c., as the case may be, indicating the quality or kind of stone the contents of the package will make when mixed with water, so that parties in ordering need only indicate what quality or kind of stone they wish to make, or state what use is to be made of the stone.

This composition is specially designed for paving of streets, roadways, sidewalks, &c., and may be laid or spread on the ground as a plastic mass, and afterward divided by grooves or indentations into blocks or slabs of any desired size or configuration before the stone has set or hardened; or I may make bricks or slabs for shipment.

A stone made of the ingredients before mentioned can be used for pavements, roadways, floors, hearths, building-stone, lawn-vases, &c.—in fact, can be used for any and all purposes to which other stone, natural or artificial, is applied.

What I claim as new is—

1. An artificial stone composed of cement, pulverized iron slag, and water or other moistening material, as set forth.

2. As a new article of commerce, cement and pulverized iron slag, mixed in suitable proportions in a dry state for transportation and use, as set forth.

In testimony whereof I affix my signature in presence of two witnesses.

BERNARD LANDE.

Witnesses:
EMMA M. GILLETT,
C. G. BERRYMAN.